United States Patent
Rapp et al.

(10) Patent No.: US 7,070,494 B2
(45) Date of Patent: Jul. 4, 2006

(54) POULTRY PICKING FINGER AND MOUNTING STRUCTURE

(75) Inventors: Geoffrey D. Rapp, Westlake, OH (US); Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 11/079,657

(22) Filed: Mar. 14, 2005

(65) Prior Publication Data
US 2005/0221744 A1 Oct. 6, 2005

Related U.S. Application Data

(60) Provisional application No. 60/553,173, filed on Mar. 15, 2004.

(51) Int. Cl.
A22C 21/02 (2006.01)
(52) U.S. Cl. ..................................................... 452/88
(58) Field of Classification Search .................. 24/453, 24/297; 403/1, 13, 14, 263, 309–313, 319, 403/329
See application file for complete search history.

(56) References Cited

U.S. PATENT DOCUMENTS

| | | | | |
|---|---|---|---|---|
| 2,316,918 A | * | 4/1943 | Updike | 16/417 |
| 3,416,771 A | * | 12/1968 | Updike | 251/337 |
| 3,628,816 A | * | 12/1971 | Ross, Jr. | 403/2 |
| 5,169,259 A | * | 12/1992 | Cornell et al. | 403/309 |
| 5,178,501 A | * | 1/1993 | Carstairs | 411/55 |
| 5,540,528 A | * | 7/1996 | Schmidt et al. | 411/55 |
| 6,196,755 B1 | * | 3/2001 | Okorocha et al. | 403/313 |

OTHER PUBLICATIONS

Flyer published by Jarvis Products Corporation describing Jarvis picking finger installer and picking finger cutter. 1 page. Publication date unknown. Upon information and belief, this publication is prior art to applicants' invention.

Catalog published by Duram Rubber Products Co. describing picking fingers for automatic defeathering machines. 16 pages. Publication date unknown. Upon information and belief, this publication is prior art to applicants' invention.

Catalog published by S.A.S. Plumatech (France) describing various picking fingers. 6 pages. Publication date unknown. Upon information and belief, this publication is prior art to applicants' invention.

Catalog published by Portaluppi Rubber F.lli s.n.c. (Italy) describing various picking fingers. 8 pages. Publication date unknown. Upon information and belief, this publication is prior art to applicants' invention.

Press release by William Goodyear Co. regarding the 2060 picking finger. 1 page. Press release date Jul. 9, 2002.

* cited by examiner

*Primary Examiner*—Thomas Price
(74) *Attorney, Agent, or Firm*—Watts Hoffmann Co., LPA

(57) ABSTRACT

Picking fingers suitable for use in automatic defeathering machines. The picking fingers are suitable for mounting to circular openings in a mounting plate. The picking finger includes an elastomeric picking finger body and a retainer for securing the picking finger to the mounting plate. Three embodiments are disclosed which provide for installation of the picking finger body from a back side of the mounting plate. Each embodiment features a different retainer component. A fourth embodiment is disclosed which provides for installation of the picking finger body from a front side of the mounting plate.

4 Claims, 7 Drawing Sheets

POULTRY PICKING FINGER AND MOUNTING STRUCTURE

CROSS-REFERENCE TO RELATED APPLICATIONS

This application claims priority from pending U.S. provisional application No. 60/553,173, filed Mar. 15, 2004 entitled "Poultry Picking Finger And Mounting Structure".

TECHNICAL FIELD

The present invention relates generally to the field of picking fingers used in automatic defeathering machines for removing feathers from poultry in poultry processing plants and, more specifically, to a picking finger having a mounting structure facilitating secure attachment of picking fingers to a mounting plate and quick and easy replacement of worn/broken picking fingers.

BACKGROUND OF THE INVENTION

One task in poultry processing plants is removal of feathers from poultry prior to subsequent processing of the poultry. Automatic defeathering machines have achieved widespread use in removing feathers from poultry. Such defeathering machines include a plurality of picking fingers which are rotated so as to impact the poultry suspended on a conveyor line moving through the defeathering machine. As the rotating fingers impact the poultry, the feathers are removed.

Typically, a plurality of picking fingers are mounted to a mounting plate, which may be in the shape of a disk or a drum. Picking fingers include a base or mounting portion and a tapered ribbed defeathering portion extended from the base portion. The base portion includes circular mounting groove. The mounting plate includes a plurality of circular openings. To install a picking finger in a mounting plate circular opening, the tapered defeathering portion is inserted from a back side of the mounting plate through a circular opening in the mounting plate. The outer diameter of the base of the picking finger is slightly larger than the diameter of the mounting plate circular opening, while the diameter of the mounting groove is about the same size as the diameter of the circular opening. The picking finger is then pulled forward, the base of the finger contacting, stretching and being pulled through the mounting plate opening until the groove pops or snap fits into the circular opening. The picking finger groove seats against a peripheral edge of the mounting plate defining the opening thereby holding the picking finger in place with respect to the mounting plate.

A defeathering machine will typically include two or more rows of mounting plates bordering each side of a path of travel through the machine. The mounting plates are rotated thereby rotating the picking fingers mounted to each plate. The picking fingers are mounted in the mounting plates and the mounting plates are oriented such that the picking fingers impact the poultry during rotation of the mounting plates. A typical defeathering machine may have 3,000 or more picking fingers. The picking fingers are subject to a water spray to rinse off the feathers as they accumulate on the fingers.

The picking fingers are typically made of resilient rubber material or rubber-like plastic material. Depending on the poultry being processed, different sizes and shapes of picking fingers are used. As the picking fingers are used, they are rotated and subject to centrifugal force, they also impact the poultry and are sprayed with water. Over time, the elasticity of the rubber decreases and the fingers become less efficient in removing feathers. Sometimes, the fingers break off in use. In either event, picking fingers have to be removed from their respective mounting plates and replaced on a regular basis.

Removal and replacement of picking fingers is a difficult and labor intensive job. If done manually, an upper or defeathering portion of the finger to be replaced is bent sideway with respect to the mounting plate and a razor blade knife is used to cut the finger at its base adjacent the mounting plate. The dangers of using a razor blade knife to cut the base of the finger while simultaneously bending the upper portion of the finger are self-evident. A new picking finger is then inserted from the back side of the mounting plate through an opening in the mounting plate as described above. Because there is an interference fit between the base portion and the mounting plate opening, a tool such as a pair of pliers must be used to forcibly pull on the defeathering portion of the finger to pull the base portion though the opening until the base portion groove snap fits into the circular opening. A prior art picking finger 10 mounted to a mounting plate 12 is shown in FIG. 1. As can be seen in FIG. 1, the finger 10 has a base portion 14 including an annular groove 16. The finger 10 is inserted from a back side B of the mounting plate 12 and pulled through a circular opening 18 in the mounting plate. The finger 10 is pulled in the forward direction F by pliers T until the groove 16 snap fits into the mounting plate opening 18.

In order to aid in the insertion of the picking fingers into the mounting plate, prior to installation, the fingers are typically soaked in water or lubricated with soap or similar lubricant. Even with the application of lubricant, installation of picking fingers is problematic because significant force is required to pull the finger base portions through the circular openings to achieve the snap fit of the annular groove in the circular opening. This problem is further exacerbated because, due to the design of defeathering machines, the positioning of mounting plates within the machine and the plurality of picking fingers on each mounting plate, there is little clearance available for removing and/or inserting picking fingers.

Power tools have been developed to aid in the removal of old picking fingers and the insertion of new fingers to a mounting plate. Picking finger cutters provide a cutting edge for cutting an old finger while picking finger installers provide a vise grip to grab and pull a new finger through a mounting plate opening. Aside from the expense, such tools have numerous disadvantages. Such tools are typically pneumatically powered and require a source of compressed air. Further, such tools require operators to drag an air hose into a production area to operate the tools thereby risking contamination of the area. Such tools are typically heavy and cumbersome to use. As such, power picking finger cutters and installers have not been widely adopted in the poultry processing industry.

What is desired is a picking finger having a mounting structure that provides for quick and secure attachment of the picking finger to the mounting plate. What is also desired is a picking finger having a mounting structure that provides for quick and easy removal of the picking finger from the mounting plate without the necessity of cutting the finger. What is also needed is a picking finger that can be removed and installed without the necessity of heavy and burdensome power tools.

SUMMARY OF THE INVENTION

The present invention features a picking finger having a mounting structure that facilitates quick and easy installation and removal of the picking finger from a mounting plate while providing for secure attachment of the picking finger to the mounting plate.

In one aspect of the present invention, a picking finger suitable for mounting to a mounting plate from a back side of the mounting plate is disclosed. The picking finger is mounting to an opening in the mounting plate and adapted to be rotated to strike objects brought in proximity to a working portion of the picking finger extending from a front side of the mounting plate. The picking finger includes:

a) a picking finger body including a base and the working portion extending from the base, the base adapted to be mounted to the mounting plate, the base including an end portion and a reduced diameter portion extending axially between the end portion and the working portion, the end portion having a diameter greater than a diameter of the opening in the mounting plate such that when the picking finger is mounting to the mounting plate the end portion abuts the back side of the mounting plate adjacent the mounting plate opening and the reduced diameter portion extends beyond the front side of the mounting plate; and b) a retainer for securing the picking finger body to the mounting plate, the retainer sized to fit into a section of the reduced diameter portion of the base and extending axially between the front side of the mounting plate and the reduced diameter portion and the working portion such that the retainer abuts the front side of the mounting plate adjacent the mounting plate.

In another aspect, the picking finger of the present invention is adapted to be mounted to the mounting plate from a back side of the plate. The mounting plate defines an opening for mounting the picking finger and the picking finger adapted to be rotated to strike objects brought in proximity to a working portion of the picking finger extending from the front side of the mounting plate. The picking finger includes:

a) a picking finger body including a base and the working portion extending from the base, the base adapted to be mounted to the mounting plate, the base including an end portion and a reduced diameter portion extending axially between the end portion and the working portion, the end portion having a diameter less than a diameter of the opening in the mounting plate, the reduced diameter portion having a diameter less that the end portion and extending axially beyond the front side of the mounting plate;

b) a retainer including a first piece and a second piece and sized to overlie a section of the base extending axially beyond the back side of the mounting plate and a section of the base extending beyond the front side of the mounting plate, the first and second pieces of the retainer including a first radially outwardly extending shoulder and a second spaced apart radially outwardly extending shoulder, the second shoulder having a diameter greater than the diameter of the mounting plate opening, the retainer further including a radially inwardly stepped portion;

c) the base of the picking finger body comprised of a resilient, compressible material such that when a radially inwardly directed pressure is applied to the first and second pieces of the retainer, a section of the base overlaid by the first and second pieces reduces in diameter whereby the first and second pieces engage along lines of contact on both sides of the first and second pieces and when the radially inwardly directed pressure applied to the first and second pieces of the retainer is removed, the section of the base overlaid by the first and second pieces enlarges in diameter whereby the first and second pieces do not engage along lines of contact on both sides of the first and second pieces;

d) when the first and second pieces of the retainer are engaged along lines of contact on both sides of the first and second pieces, a diameter of the first radially outwardly extending shoulder being reduced such that the shoulder can pass through the opening in the mounting plate opening and when the first and second pieces of the retainer are not engaged along lines of contact on both sides of the first and second pieces, the diameter of the first radially outwardly extending shoulder being increased such that the shoulder cannot pass through the mounting plate opening; and e) the retainer being positioned with respect to the mounting plate opening such that the first radially outwardly extending shoulder abuts the back side of the mounting plate adjacent the mounting plate opening and the second radially outwardly extending shoulder abuts the front side of the mounting plate, the radially inwardly stepped portion of the retainer extends into a section of the reduced diameter portion of the base extending axially beyond the front side of the mounting plate.

These and other objects, advantages, and features of the exemplary embodiment of the invention are described in detail in conjunction with the accompanying drawings.

DETAILED DESCRIPTION OF THE PREFERRED EMBODIMENTS

Figure 1:
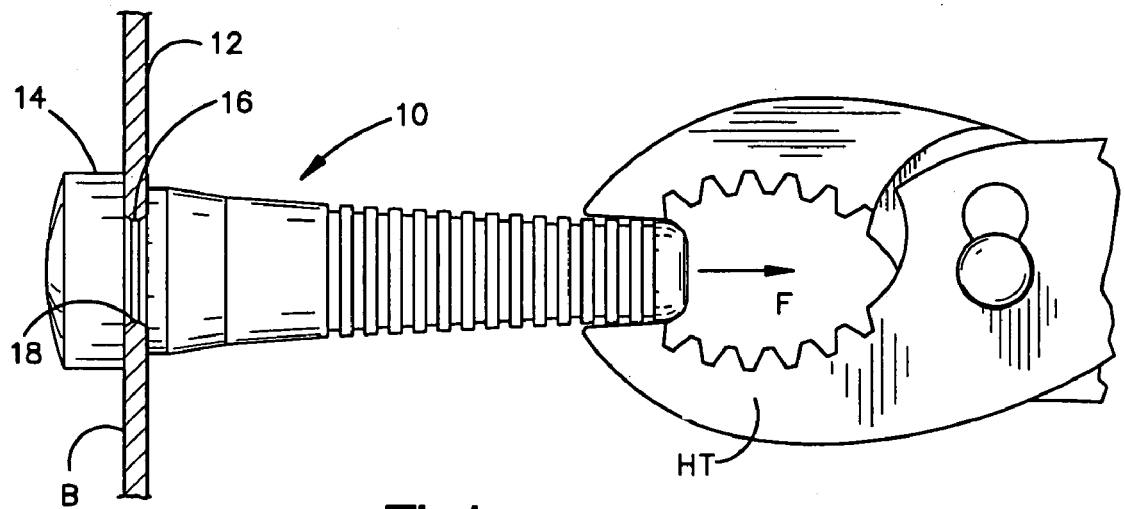
FIG. 1 is a sectional view of a prior art picking finger mounted in a mounting plate.
Figure 2:
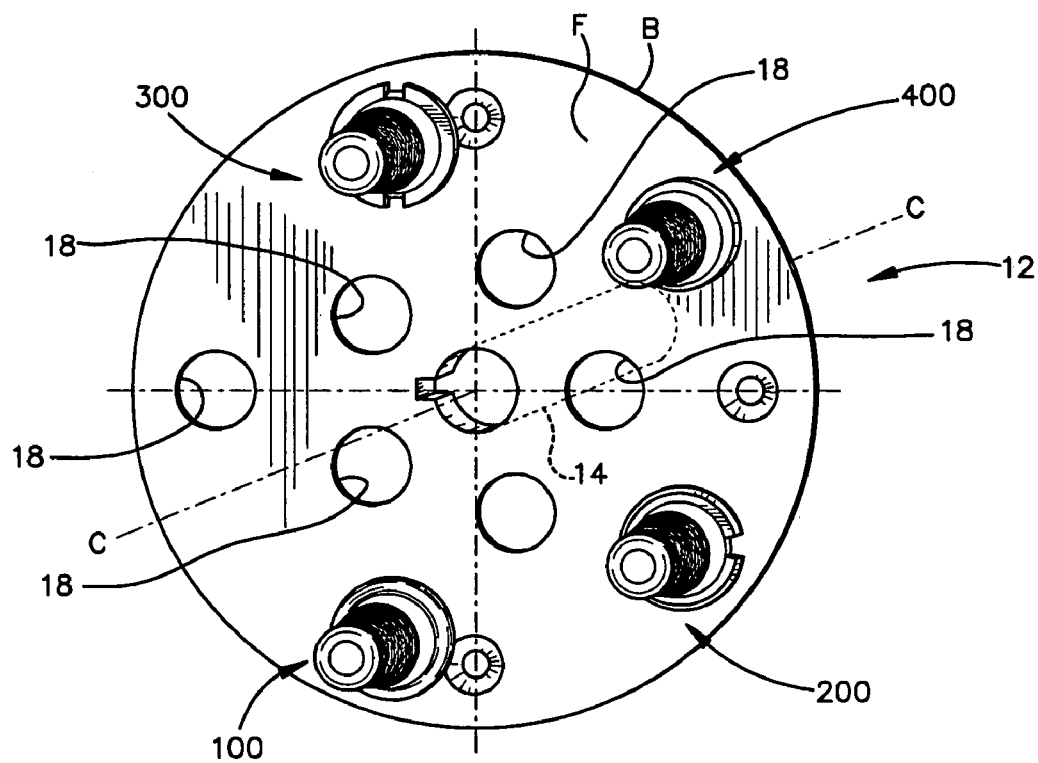
FIG. 2 is a front perspective view of a mounting plate and four embodiments of picking fingers and associated mounting structure of the present invention.

FIG. 2 illustrates four embodiments 100, 200, 300, 400 of a picking finger of the present invention mounted to a disk shaped mounting plate 12. In use, the mounting plate 12 is attached to a keyed rotating shaft 14 of a poultry defeathering machine (not shown) and is rotated by a motor (not shown) coupled to the shaft 14. The mounting plate 12 rotates about an axis of rotation C—C (FIG. 2) thereby rotating the picking fingers. Poultry (shown schematically in FIG. 3) hanging from a line of hangers move along a path of travel through the defeathering machine and pass between banks of rotating vertically oriented mounting plates positioned on either side of the path of travel.

The mounting plates of the defeathering machine are positioned such that the rotating picking fingers contact items of poultry as the individual items pass through the machine thereby pulling or stripping feathers from the poultry. The picking fingers must be relatively soft and flexible so as not to damage the poultry upon contact and are typically made of a soft, resilient material such as rubber. The hardness and specific shape of a picking finger, as well as the positioning of the mounting plates along the path of travel of the poultry, is dependent on the size and type of poultry to be defeathered.

Although only four picking fingers are shown mounted to the mounting plate 12, in use, six additional picking fingers would also be mounted in the six additional circular openings 18 of the mounting plate 12. In the defeathering machine, multiple banks of rotating vertically oriented mounting plates with extending picking fingers would be disposed on each side of a path of travel of the poultry through the machine. As the poultry pass through the machine on hangers which allow limited movement and spinning of the poultry, each individual item of poultry is impacted by hundreds or thousands of rotating picking fingers resulting in the stripping of all of nearly all of the feathers from the poultry by the fingers. As the mounting plates rotate, the defeathering portion of the fingers flex radially outwardly due to centrifugal force from the rotation. Typically, the rotating picking fingers are continuously rinsed so as to avoid a build up of feathers on the fingers which tends to decrease the feather stripping ability of the fingers.

While the mounting plate 12 is disk-shaped, the picking fingers of the present invention are equally adapted to be used in cylindrical shaped mounting plates where the picking fingers are mounted in openings in the mounting plate, as well as other shapes of mounting plates. As used herein, a front side F of the plate 12 means the side of the plate facing the poultry P (FIG. 3) when in the plate 12 is installed in a defeathering machine and the poultry P is moving along a path of travel PT through the defeathering machine. A back side B of the plate 12 means the side of the plate 12 facing away from the poultry P as it moves along the path of travel PT. It should also be recognized that the poultry fingers of the present invention may also be advantageously be used in other machines that are use for cleaning/processing of products utilizing fingers mounted to a mounting plate such as, but not limited to, for example, machines that are used for automatic cleaning of vegetables.

First Embodiment 100 of Picking Finger

Figure 3:
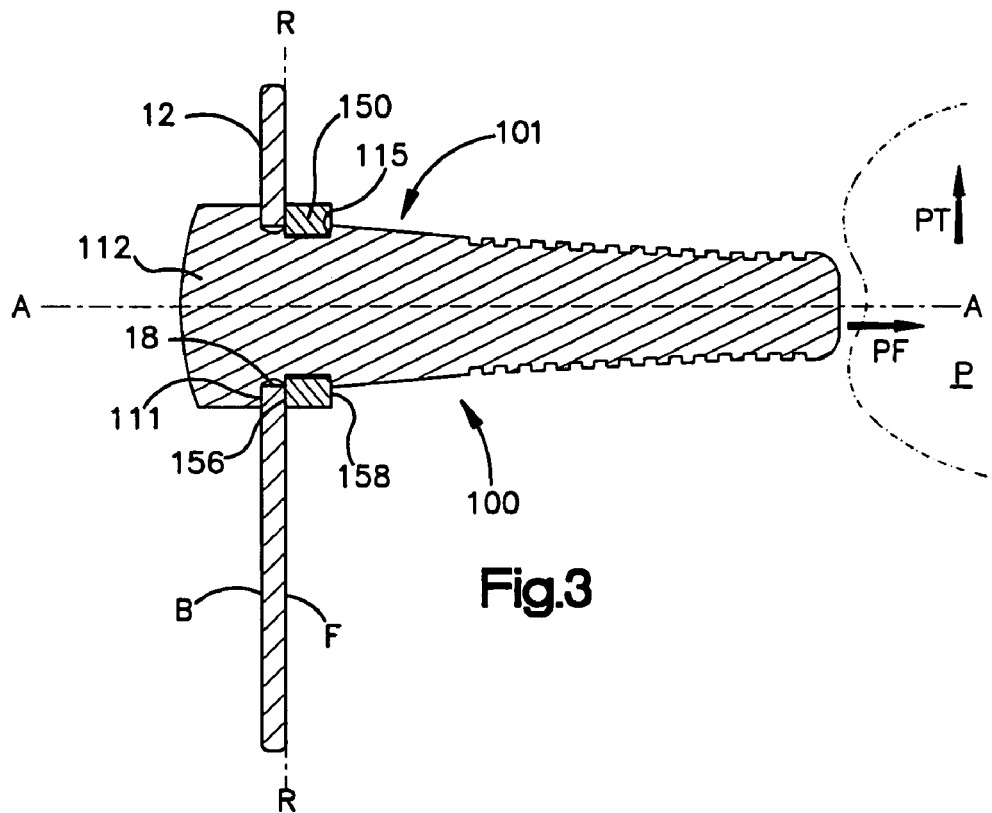
FIG. 3 is a sectional view of a first embodiment of a picking finger of the present invention featuring a picking finger inserted from a back side of the mounting plate and a mounting structure including an o-ring retainer.
Figure 4:
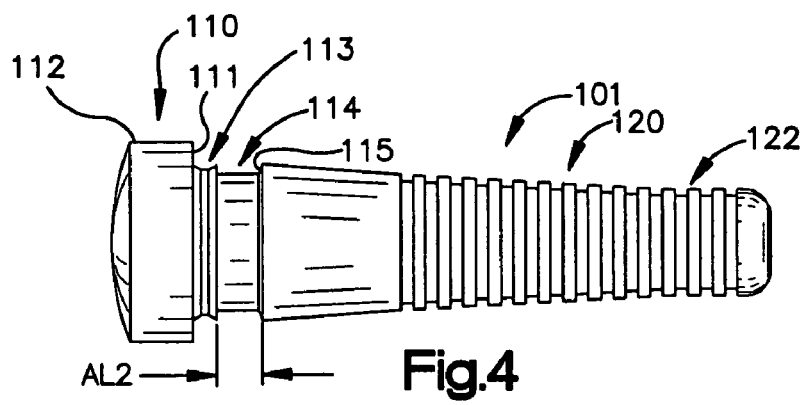
FIG. 4 is a side elevation view of the picking finger of FIG. 3.
Figure 5:
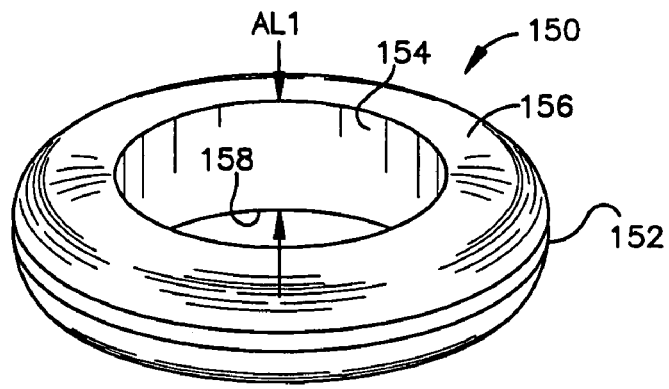
FIG. 5 is a perspective view of the o-ring retainer of FIG. 3.

The first embodiment of the picking finger of the present invention is shown as 100 in FIGS. 3–5. The picking finger 100 includes a picking finger body 101 having a base mounting portion 110 and a tapered, ribbed defeathering portion 120. Preferably, the picking finger body 101 is fabricated from an elastomeric material, for example, a rubber composition, and may advantageously be molded. The picking finger body 100 is inserted from the back side B of the mounting plate 12 with a distal section 122 of the defeathering portion 120 inserted through a circular opening 18 of the mounting plate 12 and pulled from the front side F of the mounting plate 12 in a direction shown as PF in FIG. 3 which is orthogonal to a general extent of the mounting plate 12.

The distal section 122 of the picking finger body 101 continues to be pulled in the direction PF until a stepped portion 111 of an enlarged end section 112 of the base portion 110 seats against the back side B of the mounting plate 12 adjacent the circular opening 18 (best seen in FIG. 3). A diameter of the enlarged end section 112 is greater than a diameter of the circular opening 18. The base portion 110 includes a first reduced diameter section 113 adjacent the stepped portion 111 that snugly fits into the circular opening 18 of the mounting plate 12.

The picking finger 100 further includes a retainer or fastener component in the form of an o-ring 150 (FIG. 5). The o-ring 150 is stretched and moved axially toward over the defeathering portion 120 and allowed to snap into place and seat on a second reduced diameter section 114 of the base portion 110. The o-ring 150 acts as a fastener or retainer to secure the mounting of the picking finger body 101 to the mounting plate 12. Preferably, the o-ring 150 is comprised of a flexible, resilient elastomeric material. The o-ring 150 may be put on or assembled to the picking finger body 101 manually or using a hand tool which stretches the o-ring radially outwardly so it can be slid over the defeathering portion 120 to the second reduced diameter section 114. An outer diameter 152 of the o-ring 150 is larger than the diameter of the mounting plate opening 18. The axial length (labeled AL1 in FIG. 5) of the o-ring 150 is slightly greater than the axial length AL2 (FIG. 4) of the second reduced diameter section 114 of the base portion 110 to provide a slight interference fit of the o-ring 150 as it is sandwiched between a shoulder 115 of the second reduced diameter portion 114 and the front side F of the mounting plate 12. Finally, an inner diameter 154 of the o-ring 150 is sized to tightly fit onto the second reduced diameter section 114.

Seating of the o-ring 150 onto the reduced diameter section 114 completes the mounting of the picking finger body 101 to the mounting plate 12. The picking finger 100 is securely attached to the mounting plate 12. The abutment of stepped portion 111 of the enlarged end section 112 against the back side B of the mounting plate 12, the abutment of a rearwardly facing side 156 of the o-ring 150 against the front side F of the mounting plate and the abutment of a forwardly facing side 158 of the o-ring 150 against the shoulder 115 of the second reduced diameter section 114 prevent movement of the picking finger 100 in an axial direction A—A (parallel to the axis of rotation C—C). The snug fit between the first reduced diameter section 113 of the base portion 110 and the periphery of the mounting plate 12 defining the opening 18 prevents movement of the picking finger 100 in a radial direction R—R, that is, in a direction parallel to a general extent of the mounting plate 12.

Second Embodiment 200 of Picking Finger

Figure 6:
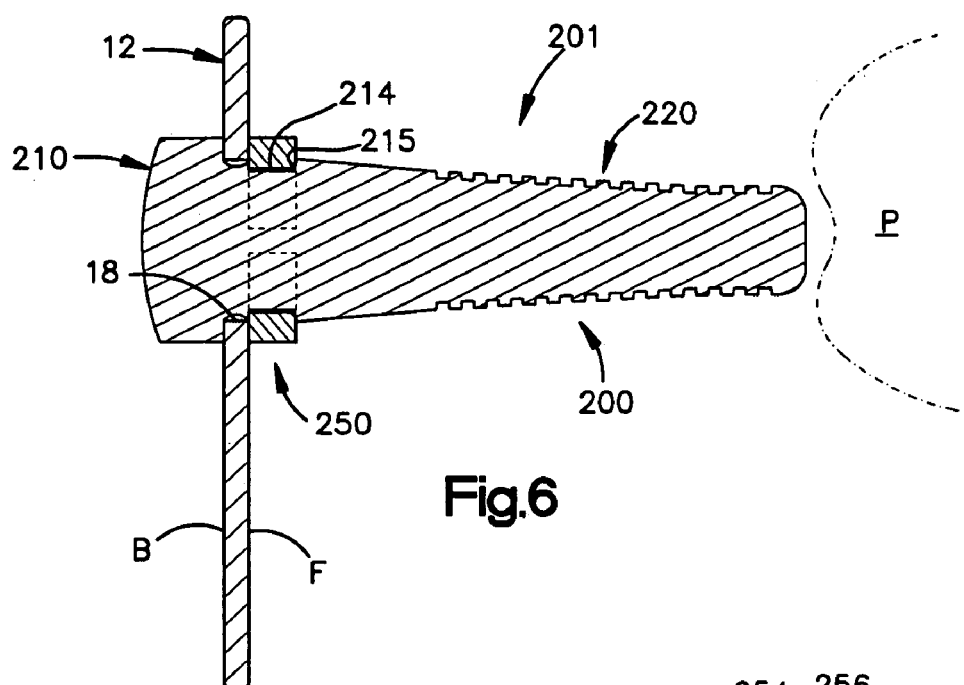
FIG. 6 is a sectional view of a second embodiment of a picking finger of the present invention featuring a picking finger inserted from a back side of the mounting plate and a mounting structure including a split ring retainer.
Figure 7:
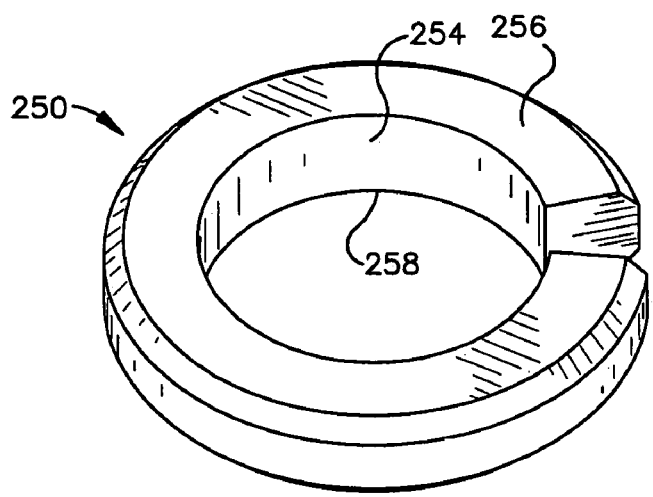
FIG. 7 is a perspective view of the split ring retainer of FIG. 6.
Figure 8:
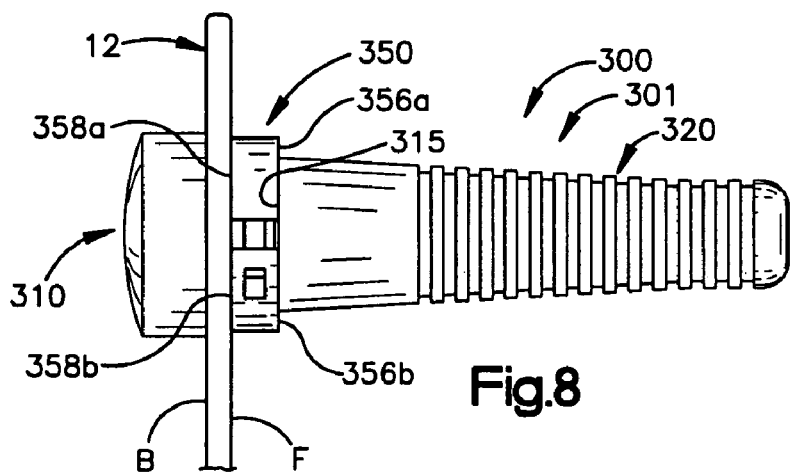
FIG. 8 is a side elevation view of a third embodiment of a picking finger of the present invention featuring a picking finger inserted from a back side of the mounting plate and a mounting structure including a two piece barbed retainer.
Figure 9:
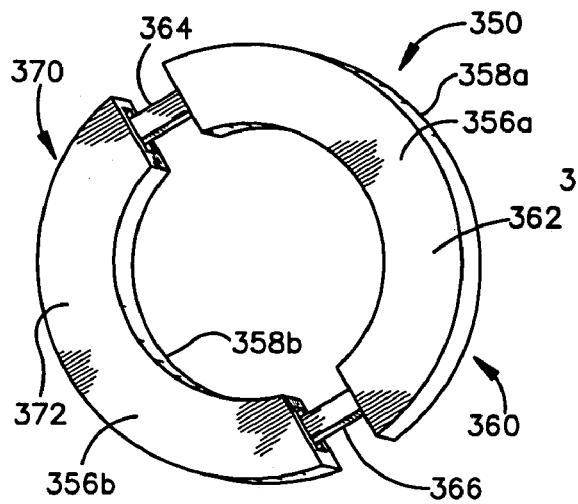
FIG. 9 is a perspective view of the two piece barbed retainer of FIG. 8 in an assembled condition.
Figure 10:
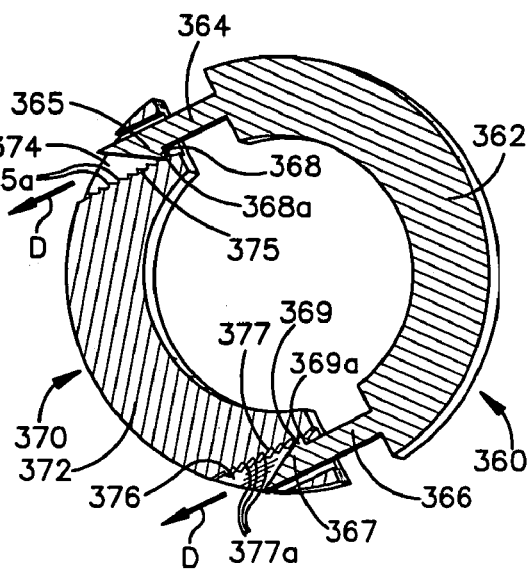
FIG. 10 is a cut-away perspective view of the two piece barbed retainer of FIG. 8.
Figure 11:
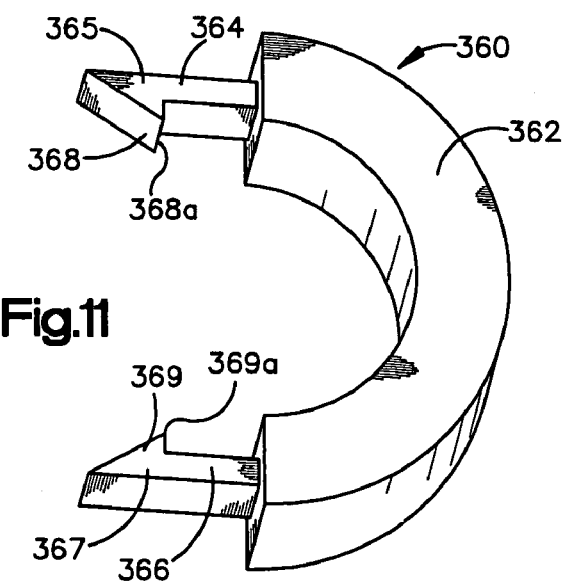
FIG. 11 is a perspective view of a first piece of the two piece barbed retainer of FIG. 8.
Figure 12:
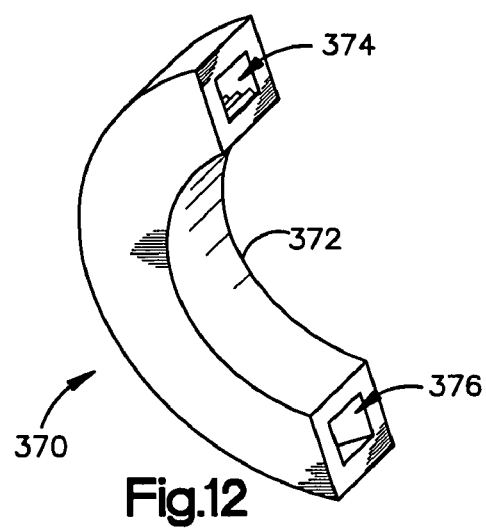
FIG. 12 is a perspective view of a second piece of the two piece barbed retainer of FIG. 8.

The second embodiment of the picking finger of the present invention is shown as 200 in FIGS. 6 and 7. The picking finger 200 is comprised of a picking finger body 201 and includes a base mounting portion 210 and a tapered, ribbed defeathering portion 220. The structure and composition of the picking finger 200 is identical to the picking finger 100 of the first embodiment except for the retaining or fastening component. In the second embodiment, the o-ring 150 of the first embodiment has been replaced by a split retaining ring 250 (best seen in FIG. 7). Preferably, the retaining ring 250 is comprised of metal or plastic. The retaining ring 250 acts as a fastener or retainer to secure the mounting of the picking finger body 201 to the mounting plate 12.

The retaining ring 250 is preferably applied with a retaining ring hand tool, that when actuated, spreads the ring 250 radially outwardly to enlarge an inner diameter 254 of the retaining ring 250 thereby allowing sufficient clearance for the ring 250 to be slid over the defeathering portion 220 of the picking finger body 201. When the retaining ring 250 is appropriately positioned over a reduced diameter section 214 of the base portion 210, the tool is released and the ring tightens around the reduced diameter section 214 of a base portion 210 to secure the picking finger body 201 to the mounting plate 12. The retaining ring 250 is sized such that, when installed, a forward facing surface 256 of the ring 250 abuts a stepped shoulder 215 of the reduced diameter section and a rearward facing surface 258 of the retaining ring 250 abuts the front side F of the mounting plate 12 thereby preventing the picking finger 200 from moving in an axial direction.

Third Embodiment 300 of Picking Finger

The third embodiment of the picking finger of the present invention is shown as 300 in FIGS. 8–12. The picking finger 300 includes a picking finger body 301 having a base mounting portion 310 and a tapered, ribbed defeathering portion 320. The structure and composition of the picking finger 300 is identical to the picking finger 100 of the first embodiment with the exception of the fastener or retainer component. In the third embodiment, the o-ring 150 of the first embodiment has been replaced by a two piece barbed retaining ring 350 (best seen in FIGS. 9–12).

The retaining ring 350 includes an arcuate first piece 360 and a mating arcuate second piece 370. The arcuate first piece 360 includes a pair of arms 364, 366 extending from a main body portion 362. As can best be seen in FIG. 11, the arms 364, 366 include barbs 368, 369.

The arcuate second piece 370 includes a matching pair of openings 374, 376 (FIG. 12) in respective ends of a main body portion 372. As can best be seen in FIG. 10, when the first and second pieces 360, 370 are assembled by moving the first piece 360 in the direction D with respect to the second piece 370, the end portions 365, 367 of the first piece extend into the openings 374, 376. The arms 364, 366 are slightly deflected as tips 368a, 369a of the barbs 368, 369 contact inner sidewalls 375, 377 of the openings 374, 376. Preferably, the retaining ring 350 is comprised of a plastic material.

To complete assembly, the first piece 360 is pressed into the second piece 370 in the direction D until respective ends 365, 367 of the first and second pieces 360, 370 are adjacent. The tips 368a, 369a of the barbs 368, 369 press against and latch into notches 375a, 377a formed in the inner sidewalls 375, 377 locking the first and second pieces 360, 370 together. The first and second pieces 360, 370 of the retaining ring 350 are positioned and assembled such that the ring 350 fits into a reduced diameter section (not shown, but similar to the second reduced diameter section of 114 of the base portion 110 of the fist embodiment) of the base portion 310. Preferably, assembly of the first and second pieces 360, 370 of the barbed retaining ring 350 is facilitated by an appropriate hand tool that, when actuated, moves the first and second pieces 360, 370 toward each other to assemble the pieces as described above.

The barbed retaining ring 350 is sized such that, when installed, a forward facing surfaces 356a, 356b of the first and second pieces 360, 370 of the ring 350 abut a stepped shoulder 315 of the reduced diameter section (not shown but identical to the reduced diameter section 114 of the picking finger body 101 of the first embodiment) of the picking finger body 301 and a rearward facing surface 358a, 358b of the first and second pieces 360, 370 of the retaining ring 350 abut the front side F of the mounting plate 12 thereby preventing the picking finger 300 from moving in an axial direction.

Fourth Embodiment 400 of Picking Finger

The fourth embodiment of the picking finger of the present invention is shown as 400 in FIGS. 13–17. The picking finger 400 of the fourth embodiment, unlike the picking fingers 100, 200, 300 of the first three embodiments, is configured to be installed in the mounting plate 12 by insertion from the front side F of the plate 12 instead of insertion from the back side B of the plate. The picking finger includes a picking finger body 401 and a retainer or fastener component 450. The base portion 410 of the picking finger body 401 includes a reduced diameter end portion 412 with is sized to fit through an opening 18' of the mounting plate 12 (best seen in FIGS. 13, 15, and 18–20). Note that the opening 18' is slightly different from opening 18 of the first three embodiments. The opening 18' includes parallel flat portions 18a' on opposite sides of the opening connected by arcuate portions 18b'.

Figure 14:
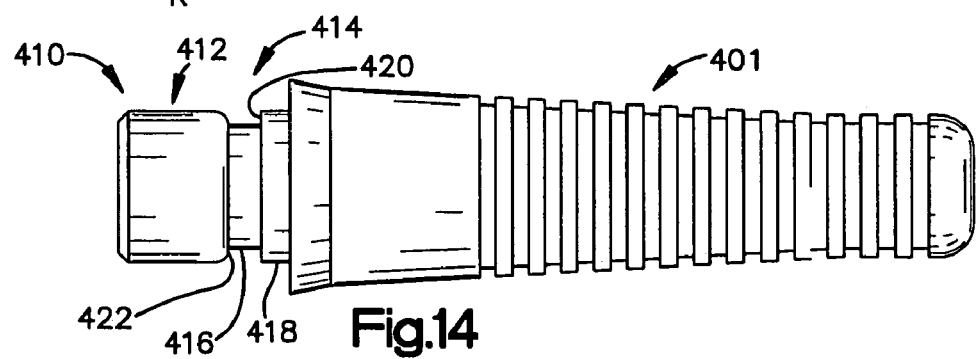
FIG. 14 is a side elevation view of the picking finger of FIG. 13.

The picking finger body 401 includes the base mounting portion 410 and a tapered, ribbed defeathering portion 420. In addition to the end portion 412, as best seen in FIG. 14, the base portion 410 includes first and second reduced diameter portions 416, 418. A diameter of the first reduced diameter portion 416 is slightly less than a diameter of the second reduced diameter portion 418 and the diameter of the second reduced diameter portion 418 is substantially the same as the diameter of the end portion 412. The composition of the picking finger body 401 is identical to the picking finger body 101 of the first embodiment.

Figure 15:
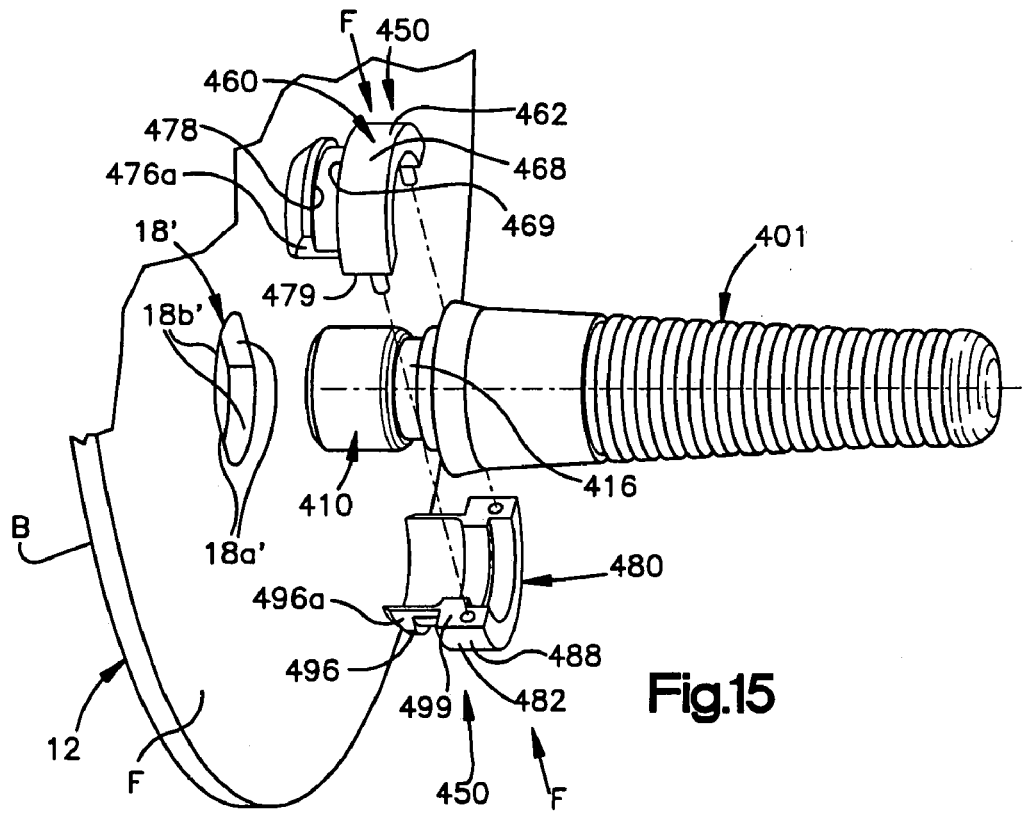
FIG. 15 is an exploded perspective view of the two piece clamp of FIG. 13.
Figure 16:
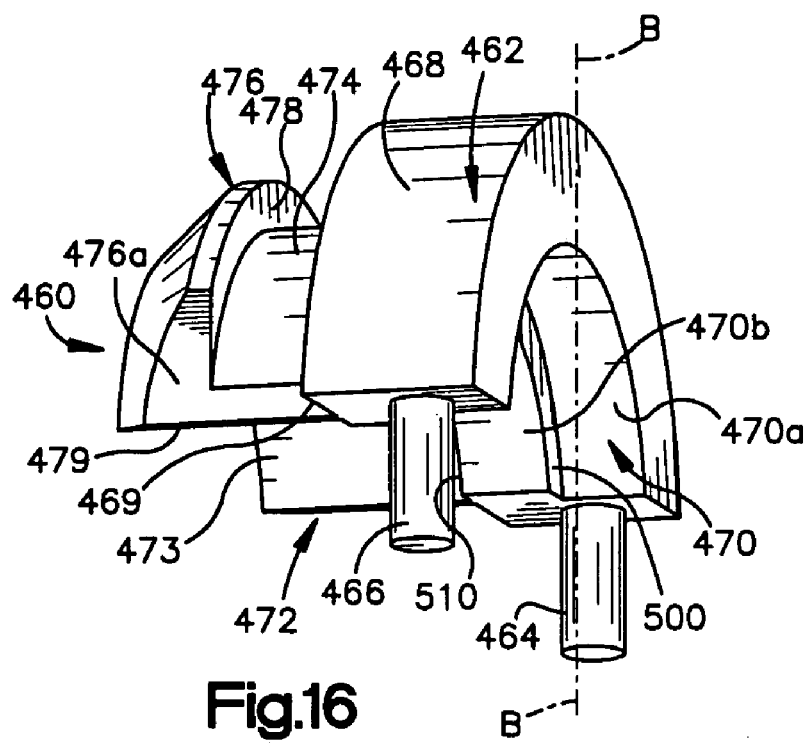
FIG. 16 is a perspective view of a first piece of the two piece clamp of FIG. 13.
Figure 17:
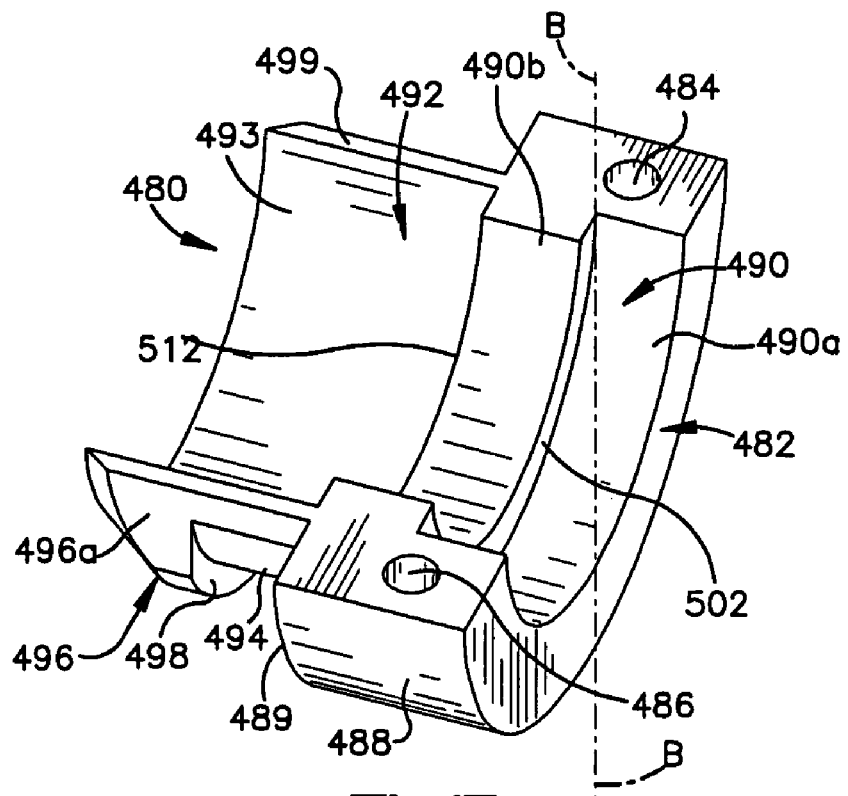
FIG. 17 is a perspective view of a second piece of the two piece clamp of FIG. 13.

In the fourth embodiment of the picking finger, the o-ring 150 of the first embodiment has been replaced by a two piece clamp 450 (best seen in FIGS. 15–17). Preferably, the clamp 450 is comprised of a plastic or elastomeric material.

The clamp 450 includes an arcuate first piece 460 and a mating arcuate second piece 480. The arcuate first piece 460 includes a pair of arms 464, 466 extending from a main body portion 462. When the first and second pieces 460, 480 are assembled, the arms 464, 466 of the first piece 460 fit into respective mating openings 484, 486 of a main body portion 482 of the second piece 480 to prevent relative movement between the pieces 460, 480 except in a direction B—B (FIG. 16) parallel to the general extent of the arms 464, 466.

As can be seen, respective outer surfaces 468, 488 of the main body portion 462, 482 are cylindrical while the respective inner surfaces 470, 490 include stepped cylindrical surfaces 470a, 470b, 490a, 490b. Extending axially from the main body portions 462, 482 of the first and second pieces 460, 480 are extending portions 472, 492. Respective inner surfaces 473, 493 of the extending portion 472, 492 are cylindrical and have a diameter substantially equal to a diameter of the inner surfaces 470a, 490a and a diameter greater than that of the inwardly stepped inner surfaces 470b, 490b.

Respective outer surfaces of the extending portions 472, 492 include cylindrical surfaces 474, 494 adjacent the respective main body portions 472, 492 and distal surfaces 476, 496 which extend from the cylindrical surfaces 474, 494. The outer distal surfaces 476, 496 define radially outwardly extending shoulders 478, 498 which extend around a portion of an outer periphery of the distal surfaces 476, 496. When the first and second clamp pieces 460, 480 are pressed together for installation, the sides or edges 479, 499 of the clamp pieces 460, 480 contact forming a line of contact between the first and second pieces 460, 480. In a region 476a, 496a adjacent the contract surfaces 479, 499, the distal surfaces are flat such that during installation to the mounting plate opening 18', the flat distal surfaces 476a, 496a are aligned with and slide through the flat sides 18a' of the mounting plate opening 18' (the alignment is best seen in FIG. 18).

To install the picking finger body 401 in a mounting opening 18', the first and second pieces 460, 480 are positioned on the finger body 401 such that the arms 464, 466 of the first piece 460 fit into respective openings 484, 486 of the second piece 480 and the inwardly stepped surfaces 470b, 490b are aligned with the first reduced diameter portion 416 of the finger body 401 and cylindrical surfaces 473, 493 of the extending portions 472, 492 are aligned with the second reduced diameter portion 418 of the finger body 401. The clamp 450 and the finger body 401 are sized such that when the first and second clamp pieces 460, 480 are positioned as described above to overlie the base portion 410 of the finger body 401, without the application of force to the first and second clamp pieces 460, 480, the first and second clamp pieces 460, 480 are spaced apart, that is, the sides or edges 479, 499 are not in contact.

Figure 18:
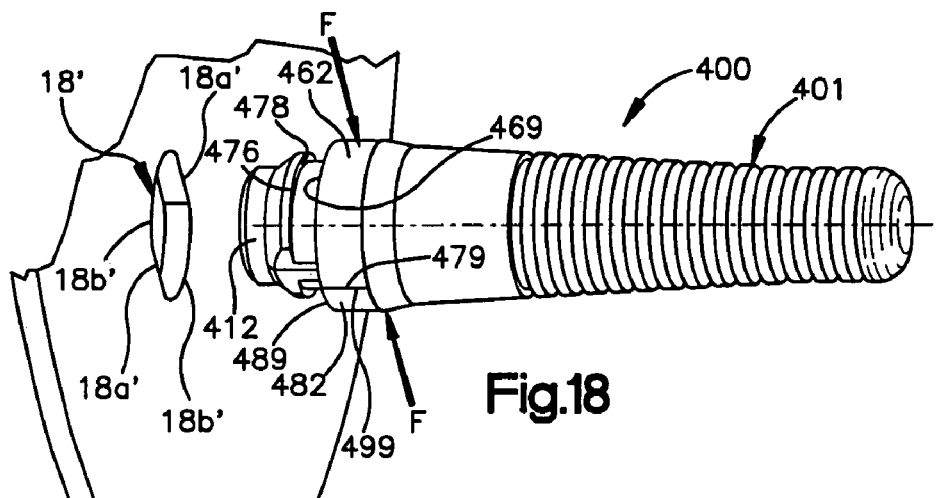
FIG. 18 is a perspective view of a picking finger body and the two piece clamp in a compressed installation position ready for mounting to an opening in a mounting plate.

To install the finger body 401 in the mounting plate opening 18', preferably a hand tool (such as a pair of pliers or a more specialized tool) is used to apply a radially inwardly directed force F (as shown in FIGS. 15 & 18) which is parallel to the axis B—B along the outer surfaces 468, 488 of the main body portions 462, 482 of the clamp pieces 460, 480. Because of the elastomeric nature of the base portion 410 of the finger body 401, application of sufficient force F to the main body portions 462, 482 of the clamp pieces 460, 480 compresses the region of the base portion 410 overlaid by the clamp 450 and causes the clamp pieces 460, 480 to move together such that sides or edges 479, 499 are in contact, as can be seen in FIG. 18.

Figure 19:
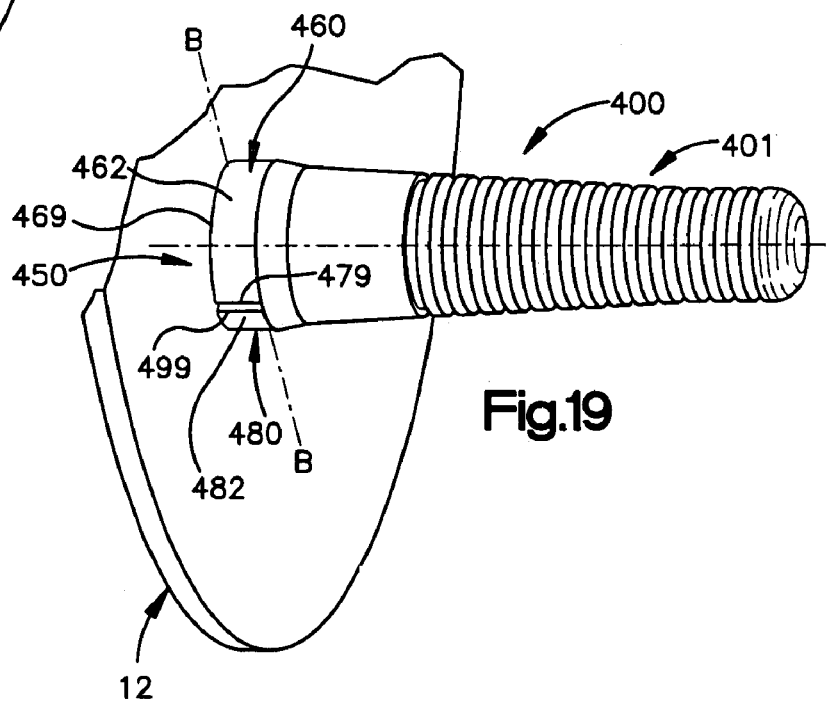
FIG. 19 is a perspective view of the picking finger body and the two piece clamp after installation of the picking finger to the mounting plate as seen from a front side of the mounting plate.

When the surfaces 479, 499 are in contact (as shown in FIG. 18), an effective diameter of the outer distal surfaces 476, 496 of the clamp pieces 460, 480 is reduced sufficiently such that the compressed base portion 410 and the outer distal surfaces 476, 496 can slide through the mounting plate opening 18'. As noted above, for insertion, the flat regions 476a, 496a must be aligned with the flat sides 18a' of the opening 18'. Insertion of the compressed base portion 410 and clamp 450 into the mounting plate 18 from the front side F of the mounting plate 12 continues until radially outwardly extending shoulders 469, 489 of the main body portions 462, 482 contact the front side F of the mounting plate (as seen in FIG. 19). At this point, the hand tool is released thereby reducing the compressive force F applied to main body portions 462, 482 of the clamp pieces 460, 480. It should be understood, that even with the compressive force F removed from the main body portions 462, 482, because of the size of the opening 18', there is still a compressive force on the clamp pieces 460, 480 and, therefore, the base 410, because of the contact between the clamp pieces and the periphery of the mounting plate 12 defining the opening 18'.

Upon removal of force F from the main body portions 462, 482, the elastomeric material of the base portion 410 returns to a larger, uncompressed diameter thereby forcing the clamp pieces 460, 480 apart such that the sides 479, 499 are no longer in contact (this is best seen in FIG. 19). Because the arms 464, 466 of the first piece 460 continue to engage the openings 484, 486 of the second piece 480, as the clamp pieces 460, 480 move apart after installation is complete and the force F is removed, they are constrained to move apart along the axis B—B.

Figure 13:
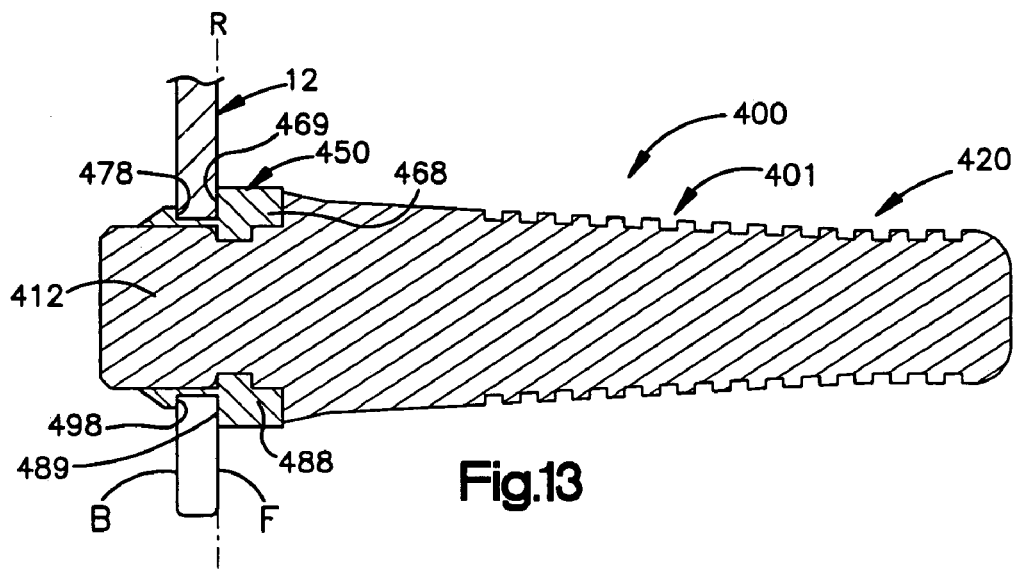
FIG. 13 is a sectional view of a fourth embodiment of a picking finger of the present invention featuring a picking finger inserted from a front side of a mounting plate and a mounting structure including a two piece clamp.
Figure 20:
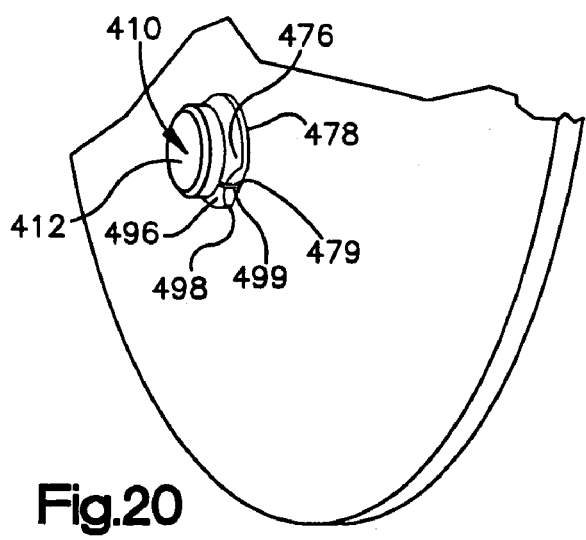
FIG. 20 is a perspective view of the picking finger body and the two piece clamp after installation of the picking finger to the mounting plate as seen from a back side of the mounting plate.

The elasticity of the elastomeric base portion 410 is sufficient such that the cylindrical outer surfaces 474, 494 bear against the periphery of the mounting plate 12 defining the opening 18' and the shoulders 478, 498 abut and bear against the back side B of the plate as can be seen in FIGS. 13 and 20. The clamp 450 cannot move in the axial direction with respect to the mounting plate 12 because the shoulders 469, 489 of the clamp pieces 460, 480 bear against the front side F of the mounting plate 12 and the shoulders 478, 498 of the clamp pieces 460, 480 bear against the back side of the mounting plate 12. Similarly, the finger 400 cannot move in the axial direction with respect to the mounting plate 12. The stepped surfaces 470b, 490b of the clamp pieces 460, 480 fit into the first reduced diameter portion 416 of the finger body 401. This results in shoulders 500, 502 (FIGS. 16 and 17) defined by the radial step between the surfaces 470a and 470b and the radial step between the surfaces 490a and 490b bearing against an edge 420 (FIG. 14) defined by a radial step between the first and second reduced diameter portions 416, 418 of the base portion 410.

This also results in shoulders 510, 512 (FIGS. 16 and 17) defined by the radial step between the surfaces 473 and 470b and the radial step between the surfaces 493 and 490b bearing against an edge 422 (FIG. 14) defined by a radial step between the first reduced diameter section 416 and the end portion 412. Finally, the snug fit between the end portion 412 of the base portion 410 of the finger and the extending portions 473, 493 of the main body portions 472, 492 of the clamp pieces 460, 480 and between the extending portion 474, 494 of the main body portions 472, 492 of the clamp pieces 460, 480 and the arcuate portions 18b' of the periphery of the mounting plate 12 defining the opening 18' prevent movement of the picking finger 400 in a radial direction R—R (FIG. 13), that is, in a direction parallel to a general extent of the mounting plate 12.

Although the present invention has been described with a degree of particularity, it is the intent that the invention include all modifications and alterations from the disclosed design falling within the spirit or scope of the appended claims.

We claim:

1. A picking finger suitable for mounting to a mounting plate having a front side and a back side and defining an opening for mounting the picking finger, the picking finger adapted to be rotated to strike objects brought in proximity to a working portion of the picking finger extending from the front side of the mounting plate, the picking finger comprising:
   a) a picking finger body including a base and the working portion extending from the base, the base adapted to be mounted to the mounting plate, the base including an end portion and a reduced diameter portion extending axially between the end portion and the working portion, the end portion having a diameter less than a diameter of the opening in the mounting plate, the reduced diameter portion having a diameter less that the end portion and extending axially beyond the front side of the mounting plate;
   b) a retainer including a first piece and a second piece and sized to overlie a section of the base extending axially beyond the back side of the mounting plate and a section of the base extending axially beyond the front side of the mounting plate, the first and second pieces of the retainer including a first radially outwardly extending shoulder and a second spaced apart radially outwardly extending shoulder, the second shoulder having a diameter greater than the diameter of the mounting plate opening, the retainer further including a radially inwardly stepped portion;
   c) the base of the picking finger body comprised of a resilient, compressible material such that when a radially inwardly directed pressure is applied to the first and second pieces of the retainer, a section of the base overlaid by the first and second pieces reduces in diameter whereby the first and second pieces engage along lines of contact on both sides of the first and second pieces and when the radially inwardly directed pressure applied to the first and second pieces of the retainer is reduced, the section of the base overlaid by the first and second pieces enlarges in diameter whereby the first and second pieces do not engage along lines of contact on both sides of the first and second pieces;
   d) when the first and second pieces of the retainer are engaged along lines of contact on both sides of the first and second pieces, a diameter of the first radially outwardly extending shoulder being reduced such that the shoulder can pass through the opening in the mounting plate opening and when the first and second pieces of the retainer are not engaged along lines of contact on both sides of the first and second pieces, the diameter of the first radially outwardly extending shoulder being increased such that the shoulder cannot pass through the mounting plate opening; and
   e) the retainer being positioned with respect to the mounting plate opening such that the first radially outwardly extending shoulder abuts the back side of the mounting plate adjacent the mounting plate opening and the second radially outwardly extending shoulder abuts the front side of the mounting plate, the radially inwardly stepped portion of the retainer extends into a section of the reduced diameter portion of the base extending axially beyond the front side of the mounting plate.

2. The picking finger of claim 1 wherein the first piece of the retainer includes a pair of arms extending from opposite sides of the first piece and the second piece of the retainer includes a pair of openings sized to slidingly receive the pair of arms, the pair of arms being of sufficient length to extend into the pair of openings when the first and second pieces do not engage along lines of contact on both sides of the first and second pieces.

3. The picking finger of claim 1 wherein the working portion includes a ribbed outer surface adapted for removal of feathers from poultry.

4. The picking finger of claim 1 wherein the picking finger body is comprised of an elastomeric material.

* * * * *